(12) United States Patent
Miller et al.

(10) Patent No.: US 9,038,172 B2
(45) Date of Patent: May 19, 2015

(54) ROBUST ANOMALY DETECTION AND REGULARIZED DOMAIN ADAPTATION OF CLASSIFIERS WITH APPLICATION TO INTERNET PACKET-FLOWS

(75) Inventors: David J. Miller, State College, PA (US); George Kesidis, State College, PA (US); Jayaram Raghuram, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 324 days.

(21) Appl. No.: 13/465,741

(22) Filed: May 7, 2012

(65) Prior Publication Data

US 2012/0284791 A1 Nov. 8, 2012

Related U.S. Application Data

(60) Provisional application No. 61/483,408, filed on May 6, 2011, provisional application No. 61/600,774, filed on Feb. 20, 2012.

(51) Int. Cl.
*G06F 11/00* (2006.01)
*G06F 21/55* (2013.01)
*H04L 29/06* (2006.01)

(52) U.S. Cl.
CPC .......... *G06F 21/554* (2013.01); *H04L 63/0227* (2013.01); *H04L 63/1425* (2013.01)

(58) Field of Classification Search
CPC ..................... H04L 63/1416; H04L 63/1408
USPC ..................................................... 726/22–25
See application file for complete search history.

(56) References Cited

U.S. PATENT DOCUMENTS

| 5,796,942 | A | 8/1998 | Esbensen |
| 7,584,507 | B1 * | 9/2009 | Nucci ............................. 726/23 |
| 7,660,248 | B1 | 2/2010 | Duffield et al. |
| 7,684,320 | B1 | 3/2010 | Nucci |
| 7,694,115 | B1 | 4/2010 | Porras et al. |
| 7,724,717 | B2 | 5/2010 | Porras et al. |

(Continued)

FOREIGN PATENT DOCUMENTS

WO    WO02/46928    6/2002

OTHER PUBLICATIONS

Adibi, S. et al. Traffic Classification—Packet-, Flow- and Application-based Approaches, *International Journal of Advanced Computer Science and Applications*, 1(1): 6-15, 2010.

(Continued)

*Primary Examiner* — Anthony Brown
(74) *Attorney, Agent, or Firm* — Gifford, Krass, Sprinkle, Anderson & Citkowski, P.C.

(57) ABSTRACT

Sound, robust methods identify the most suitable, parsimonious set of tests to use with respect to prioritized, sequential anomaly detection in a collected batch of sample data. While the focus is on detecting anomalies in network traffic flows and classifying network traffic flows into application types, the methods are also applicable to other anomaly detection and classification application settings, including detecting email spam, (e.g. credit card) fraud detection, detecting imposters, unusual event detection (for example, in images and video), host-based computer intrusion detection, detection of equipment or complex system failures, as well as of anomalous measurements in scientific experiments.

24 Claims, 1 Drawing Sheet

(56) References Cited

U.S. PATENT DOCUMENTS

| | | | |
|---|---|---|---|
| 7,773,510 | B2 | 8/2010 | Back et al. |
| 7,773,598 | B2 | 8/2010 | Lindholm et al. |
| 2004/0003094 | A1 | 1/2004 | See |
| 2006/0075496 | A1 | 4/2006 | Carpenter et al. |
| 2006/0122810 | A1 | 6/2006 | Clarke et al. |
| 2006/0239219 | A1 | 10/2006 | Haffner et al. |
| 2007/0076606 | A1 | 4/2007 | Olesinski et al. |
| 2008/0072326 | A1 | 3/2008 | Danford et al. |
| 2009/0319507 | A1* | 12/2009 | Chen et al. .......... 707/5 |
| 2011/0019574 | A1 | 1/2011 | Malomsoky et al. |
| 2011/0040706 | A1 | 2/2011 | Sen et al. |
| 2011/0267964 | A1* | 11/2011 | Baltatu et al. ......... 370/242 |
| 2012/0185415 | A1* | 7/2012 | Chenthamarakshan et al. .............. 706/12 |

OTHER PUBLICATIONS

Bernaille, L. et al. Traffic Classification on the Fly. *ACM SIGCOMM Computer Communication Review*, 36(2): 23-26, 2006.

Hong, M. et al. Identifying online traffic based on property of TCP flow, *The Journal of China Universities of Posts and Telecommunications*, 16(3): 84-88, Jun. 2009 (Abstract only).

Ilvesmäki, M. et al. Adaptive Flow Classification in IP Switching—The Measurement Based Approach, *Helsinki University of Technology*, 1998.

Lim, Y. et al. Internet Traffic Classification Demystified: On the Sources of the Discriminative Power, *University of Massachusetts; Seoul National University*, 2009.

Ocampo, R. et al. Towards Context-Based Flow Classification, *International Conference on Autonomic and Autonomous Systems*, 2006 (Abstract only).

Williams, N. et al. A Preliminary Performance Comparison of Five Machine Learning Algorithms for Practical IP Traffic Flow Classification, ACM SIGCOMM Computer Communication Review, 36(5): 7-15, Oct. 2006.

Yingqiu, L. et al. Network Traffic Classification Using K-means Clustering, Second International Multisymposium on Computer and Computational Sciences, pp. 360-365, 2007.

Zhang, J. et al. An Automated On-line Traffic Flow Classification Scheme, Intelligent Information Hiding and Multimedia Signal Processing, IIH-MSP, Sep. 2009 (Abstract only).

Zuev, D. et al. Traffic Classification using a Statistical Approach, University of Oxford; University of Cambridge, 2005.

\* cited by examiner

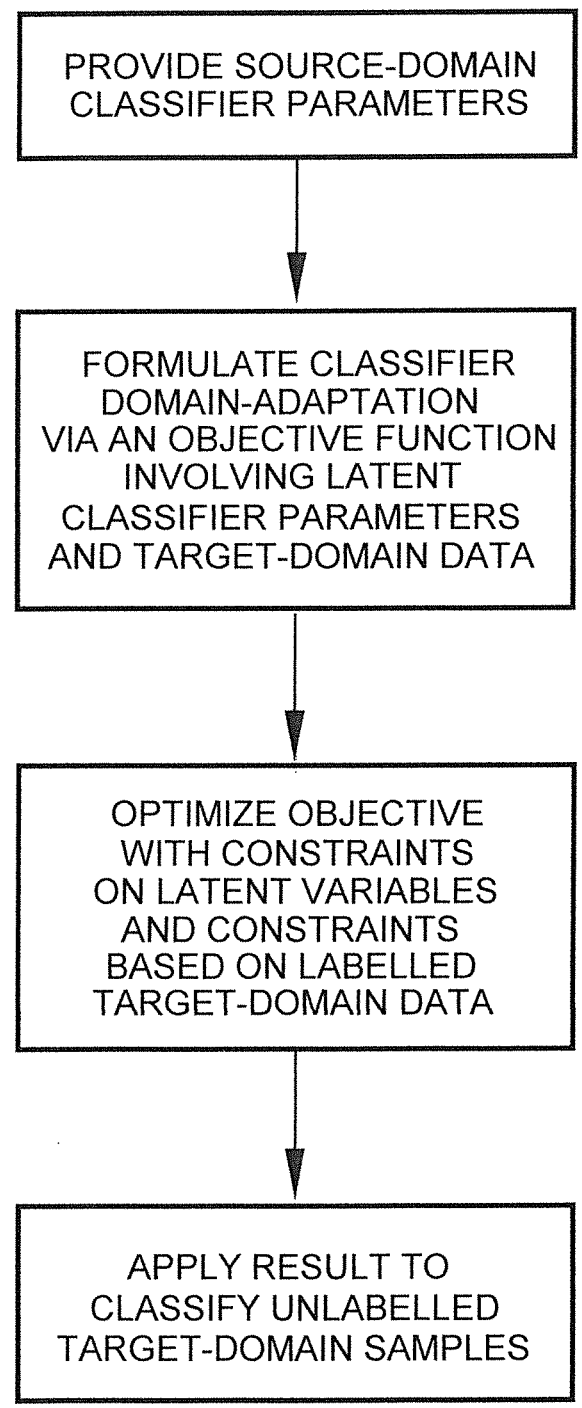

ROBUST ANOMALY DETECTION AND REGULARIZED DOMAIN ADAPTATION OF CLASSIFIERS WITH APPLICATION TO INTERNET PACKET-FLOWS

REFERENCE TO RELATED APPLICATIONS

This application claims priority to U.S. Provisional Patent Application Ser. Nos. 61/483,408, filed May 6, 2011 and 61/600,774, filed Feb. 20, 2012, the entire content of both being incorporated herein by reference.

FIELD OF THE INVENTION

This invention relates generally to anomaly detection and, in particular, to robust anomaly detection and regularized domain adaptation of classifiers with application to Internet packet flows.

BACKGROUND OF THE INVENTION

The problem of anomaly detection has great practical significance, manifesting in a wide variety of application domains, including detection of suspicious/anomalous events in Internet traffic, in human behavior and/or entity tracking, host-based computer intrusion detection, detection of equipment or complex system failures, as well as of anomalous measurements in scientific experiments, which may indicate either equipment glitches or interesting phenomena. There is substantial prior literature on anomaly detection for network intrusion detection, e.g. [25][9], based on numerous proposed statistical tests and heuristic criteria. Most such approaches will only be effective in detecting specific types of anomalies, within particular networking domains.

The scenario addressed here is the detection of anomalies amongst the T samples in a collected data batch, $X=\{\underline{x}_i: i=1,\ldots,T, \underline{x}_i \text{ in } R^N\}$. The batch may consist, for example, of the samples collected over a fixed window of time (during which, in the absence of anomalies, these "normal" (known nominal and/or known attack) samples are all expected to follow the same probability law (even if this law is not explicitly known)). We assume there is a database exclusively containing "normal" examples that can potentially be leveraged both for learning the "normal" probability model (either on the full N-dimensional space or on lower-dimensional subspaces) and possibly for assessing statistical significance of detected anomalies (measuring empirical p-values (by a p-value, we mean the probability of making an observation more extreme than a given observation, under an assumed probability law)).

There are several reasons why N may be large. First, some applications are inherently high dimensional, with many (raw) features measured. Second, large N may enable greater anomaly detection power. In supervised classification, it may be possible to discriminate known classes using a small number of (judiciously chosen) features that have good (collective) discrimination power. However, anomaly detection is inherently unsupervised—there are generally no anomalous "examples" and no prior knowledge on which subset of raw (and/or derived) features may best elicit anomalies. This suggests use of more features increases the likelihood that a sample will manifest a detectable effect. Moreover, for malicious network traffic packet flows that mimic Web application flows to evade detection. more—rather than fewer—features may typically be required to detect "evasive" anomalies.

Two standard anomaly detection strategies are: 1) Applying a single test, based on the joint density function defined on the full N-dimensional feature space; 2) Applying multiple tests, e.g. tests on all single feature and all pairwise feature densities, with the (highest priority) detected anomaly the sample yielding the smallest p-value over all the tests. There are two problems with 1). First, if N is large relative to the size of the database of "normal" exemplars, the estimation of the joint density function will be inaccurate (i.e., there is a curse of dimensionality). Second, suppose that the features are statistically independent and that the anomaly only manifests in one (or a small number) of the features. In this case, the joint log-likelihood is the sum of the marginal (single feature) log-likelihoods, and the effect of a single (anomalous) feature on the joint log-likelihood diminishes with increasing N.

There are also difficulties with 2). First, there is the complexity associated with using a number of tests combinatoric (e.g., quadratic) in N. However, even ignoring complexity, use of many tests may unduly increase the number of false alarms. To give a hint of this, suppose that there is a single anomaly in the batch, with the anomaly detected by only one of the $K=N+N(N-1)/2$ single and pairwise tests, with p-value p. Assuming that the tests are independent, the probability that no other sample will have a smaller p-value (and will thus be falsely detected first, prior to detecting the anomaly), given p, is $(1-p)^{K(T-1)}$, i.e., it is exponentially decreasing in KT. Supposing $p=10^{-5}$, this probability is about 0.9 for $KT=10^4$, and it is vanishing by $KT=10^6$.

For high (N)-dimensional feature spaces, we consider detection of anomalous samples amongst a batch of collected samples (of size 7), under the null hypothesis that all samples follow the same probability law. Since the features which will best identify possible anomalies are a priori unknown, two common detection strategies are: 1) evaluating atypicality of a sample (its p-value) based on the null distribution defined on the full N-dimensional feature space; and 2) considering a (combinatoric) set of low order distributions, e.g. all singletons and all feature pairs, with detections made based on the smallest p-value yielded over all such low order tests. Approach 1 (in some cases, unrealistically) relies on accurate knowledge/estimation of the joint distribution, while 2) suffers from increased false alarm rates as N and T grow.

Messages over the Internet, e.g., emails or web content, are segmented into Internet Protocol (IP) packets by software in the end-systems. Packets or datagrams are payload (message) and header, where the header has the necessary addressing information so that Internet devices (routers, switches) can forward it to its intended destination. The 32-bit binary IP addresses are obtained from the familiar domain name through the Internet's DNS name resolution system, e.g., my mail server mail.engr.psu.edu has IP address 130.203.201.3 where, e.g., (decimal)130=(binary)10000010. The payloads of IP packets, containing the message segments, are typically no longer than about 1500 bytes each. IP packets have addressing information in their headers, including the IP five-tuple:

- 32-bit source (return) and destination IP addresses,
- 16-bit source and destination port numbers, e.g., one could indicate the packet is part of an http (web) message (port=80), and the other would identify the specific application on the client end-system that initiated the web session.
- The type of layer-4 play, i.e., for a web application it would be TCP.

Software (TCP) in the end-systems adapts messaging to the Internet, including message segmentation into packets at sender and reassembly at receiver. Reassembly is based on sequence numbers in the TCP (layer 4) portion of the packet headers. Cisco's Netflow software will process a trace of observed packets (in TCPdump format) to extract flow (or session) level features, where a flow is a group of packets with common IP 5-tuple (sIP:sport, dIP:dport, protocol) that are proximal in time (such that a time-out threshold is not tripped). For example, if an email is sent to a person's Yahoo email account from my Penn State engineering webmail account, the packets constituting my email would be proximal in time with:

sIP=130.203.201.3 (my mail server's 32-bit IP address)
dIP=217.146.187.123 (that of mail.yahoo.com)
sport=21443 (a random number for the session chosen between $2^{10}$ and $2^{16}$)
dport=25 (SMTP, meaning email)
protocol=TCP Companies and government agencies are interested in monitoring the on-line activities of their employees to protect against:

Intrusions seeking to steal/exfiltrate sensitive data (e.g., Wikileaks), damage the targeted network, or deny access to critical resources (denial of service/access to bandwidth, data or computational resources).

Insider attacks with similar goals targeting unauthorized handling, integrity, and/or availability of network services/resources, data or documents.

Loss of productivity via potentially frivolous network activity while at work, such as facebook, BitTorrent, youtube, etc.

In the West, such monitoring is common in not-public-commodity (e.g., private enterprise) IP networking contexts. Such monitoring, achieved through direct examination of transmitted packets in-flight in the network (part of a network-based intrusion detection system (NIDS)), extends that achieved by firewalls of "stateful" (inter-packet) deterministic signatures, and complements packet-level signature checking, host-based intrusion-detection systems (HIDS), protocol anomaly detection (PAD) systems, etc.

Deterministic signatures are based on known attacks. Even deterministic signatures are reluctantly disclosed because of a desire for covert defense, i.e., one does not want a continuing attacker to know the signature and then to modify the attack to evade it. Complex nominal background and attack traffic is difficult to succinctly characterize in very high-dimensional feature space; also, it is time-varying (beyond time-of-day effects and the like) and domain dependent. So, potentially threatening anomalies are difficult to confidently characterize.

In the past, the type of session (e.g., web, VoIP, email) was largely conveyed by the ("well known", <1024) server port number (=dport of client-transmitted packet in a client-server session). Such port numbers are easily spoofed. Alternatively, deep packet inspection (DPI) of the payloads can convey flow-type information, e.g., a URL (web address) in an HTTP header indicates a web app. Increasingly, these methods are too crude and unreliable in the presence of flow-type obfuscation such as payload encryption, evolving attack vectors, and the running of custom flow/congestion control over UDP (e.g., utorrent), which obfuscates the "protocol" type.

Generally, the usability/security trade-off of the target operating environment is often not clearly defined. The IDS needs to be initially calibrated to its operating environment upon deployment (which can be done inexpensively and accurately via our anomaly detection and domain adaptation systems, as we describe below). The IDS needs to be continuously recalibrated thereafter to track evolving attacks and changes to nominal background traffic (in addition to known adaptations to time-of-day, day-of-week, etc.). Also, there is a basic need for anomaly detection of "unknown unknowns" and to explore mock attacks that are variations of known attacks, i.e., "known unknowns".

The need for domain adaption is motivated by the not surprising fact that a classifier (or anomaly detection system) trained at one physical port may perform poorly if tested at a different one (similarly, for time-of-day differences between training and test sets even at the same physical port). This phenomenon has been observed between different domains with the same traffic mix, thus motivating the need for inexpensive domain adaptation, instead of expensive retraining from scratch (requiring a large pool of labeled training examples) on the target domain.

A statistical classifier is a function or a rule which takes an input pattern called a feature vector and returns one of K possible outputs, called classes. The classifier's decision rule is learned using examples of the (input pattern, class label) pair, such that the learned decision rule is able to classify the labeled examples accurately, and also to generalize well to new patterns (feature vectors) which are generated from the same underlying probability distribution. The labeled examples are called training data. Determining these (ground-truth) training labels usually requires effort, expense, and potentially human labor and expertise. The learning of a classifier in this case is called supervised learning because all the examples used for learning have class labels.

Another common framework called unsupervised learning aims to learn the underlying structure of the data (input patterns) in the absence of any supervision information (usually class labels). An important problem in unsupervised learning is clustering, where the data is partitioned into groups or clusters whose members are similar to each other, and different from the members of other clusters. There are many popular methods for clustering such as the K-means algorithm, hierarchical clustering, and mixture model based clustering. At this point it is useful to make the distinction between classes, clusters, and mixture components. The clusters or groups of data obtained from a clustering method do not take class labels into consideration, and hence a cluster may contain data points from multiple classes, in different proportions. In mixture model based clustering the joint probability distribution of the features is modeled with a mixture of parametric distributions (e.g. Gaussian, Bernoulli, exponential). The individual components of the mixture model are conceptually similar to clusters, with (data) points probabilistically assigned to individual components based on how well the components explain their stochastic generation. When a cluster or component has all of its data from the same class, it is said to be class-pure, whereas in general there is a probability distribution of the class within each mixture component or cluster.

In between the above two frameworks is semisupervised learning, in which only a small portion of the data examples possess class labels, while the rest are unlabeled. In many practical applications, unlabeled samples (data) can be easily collected, while only a limited number of labeled samples are available. Since labeled data may be difficult or time-consuming to obtain, machine learning techniques which make effective use of both labeled and unlabeled data have received considerable recent attention. In the most common objective for semisupervised learning, a small set of labeled samples is augmented with a large number of unlabeled samples, with the aim of learning a better classifier than that learnable using the labeled samples alone. There is potential for this because the unlabeled samples can help to learn a more accurate model for the data distribution, which in turn improves the model of the class posterior distribution of the classifier.

In both supervised and semisupervised classification frameworks, it is assumed that the distribution of the data on which the classifier is trained is the same as the distribution of the data on which it is deployed to make predictions. This assumption may not be true in some situations, and we may be required to train a classifier on labeled data from one domain and apply it to predict on data from a different domain, where the underlying data distribution is different, but not drastically different. Also, obtaining labeled data in this new domain may be difficult and/or expensive, whereas in general there will be plenty of unlabeled data available. This problem arises when there is a contextual difference in the way the data is generated in the two domains. For example, we may have a classifier trained on labeled data obtained at a particular time, or at a particular location, and we may want to be able to make accurate predictions on data obtained at different times or at different locations, for which labeled examples are not available. Also, there could be situations where the distribution of features in the two domains changes conditioned on the value of a latent variable and the class. For example, in a network scenario, the demand profile for a certain type of traffic flow could be different at two sites, domains, or time-of-day, such that the training data was captured when the demand (total bytes or packets) was low, while the test data is captured when the demand is high. In this case the latent variable is a binary valued indicator taking on values "high" or "low" (which may signify different times of day, with different traffic demands).

In such cases, directly porting a classifier may give poor results and is not a good idea. At the same time, we want to be able to make use of the labeled data and the classifier available from the different, but related (training) domain. This is known as the classifier domain adaptation problem, which has recently received a lot of recent attention, particularly from the text, natural language processing, and remote sensing communities. Following the terminology in the literature, we refer to the domain where the classifier is trained using labeled data as the source or training domain, and the domain to which we want to adapt the classifier as the target or test domain. Domain adaptation methods can be categorized as semisupervised or unsupervised depending on whether a small amount of labeled data from the target domain is available or not.

SUMMARY OF THE INVENTION

This invention is directed to prioritized, sequential anomaly detection in a collected batch of sample data. The method provides a sound, robust mechanism for identifying the most suitable, parsimonious set of tests to use, adaptive to the networking domain, to the particular anomalies/attacks that may be present in the batch, and to temporally changing (nominal) network traffic statistics. While the focus is on detecting anomalies in network traffic flows and classifying network traffic flows into application types, the methods are also applicable to other anomaly detection and classification application settings, including detecting email spam, (e.g. credit card) fraud detection, detecting imposters, unusual event detection (for example, in images and video), host-based computer intrusion detection, detection of equipment or complex system failures, as well as of anomalous measurements in scientific experiments.

The classifiers and probability models are based on network traffic features that are (computationally and memory-wise) feasible to measure in practice, and which are robust, i.e. features that are not readily susceptible to obfuscation or tampering. In particular, we will not employ features based on packet payload information acquired on-line by so-called deep packet inspection (DPI) technology. Inspecting payload information may violate privacy laws and is generally difficult to perform carefully at scale. Moreover, simple encryption methods (e.g. a randomized substitution cypher) can render payload information useless for classification purposes. Also, the classifiers and probability models we develop will not consider fields that can be readily tampered with such as port numbers or protocol-specific information in the payload header.

For high (N)-dimensional feature spaces, we consider detection of anomalous samples (i.e., samples from unknown classes or "unknown unknowns") amongst a batch of collected samples (of size T), under the null hypothesis that all samples follow the same probability law. Since the features which will best identify possible anomalies are a priori unknown, several common detection strategies are: 1) evaluating atypicality of a sample (its p-value) based on the null distribution defined on the full N-dimensional feature space; 2) considering a (combinatoric) set of low order distributions, e.g. all singletons and all feature pairs, with detections made based on the smallest p-value yielded over all such low order tests.

The first approach (in some cases, unrealistically) relies on accurate knowledge/estimation of the joint distribution, while the second suffers from increased false alarm rates as N and T grow. Alternatively, we describe a novel sequential anomaly detection procedure with a growing number of tests. Here, new tests are (greedily) included only when they are needed, i.e., when their use (on a currently undetected sample) will yield a lower (multiple testing) corrected p-value than that obtained on any of the samples using the existing test cadre.

The invention broadly aims to maximize the aggregate statistical significance of "all detections made up until now." Equivalently, it maximizes the "front-loaded" partial area under the curve (AUC) of an estimated receiver-operating characteristic (ROC) curve. We also develop variants of the method for the cases where both the data batch and training data (used to estimate the reference/null distributions) may be (on-line) adapted over time. Our anomaly detection system may be coupled with an active learning system that is learning to discriminate interesting/suspicious anomalies ("unknown unknowns" from unknown classes or "known unknown" samples of unknown clusters from known classes) from innocuous/uninteresting ones (samples from known classes including "attack" classes), as well as learning to identify the features whose atypicalities are essential for such discrimination.

The reference/null distribution may consist of a mixture of multiple known data classes. In going from one domain to another (e.g. from one enterprise computer/communication network to another where each sample corresponds to a flow/session of packets), the class distributions may change, either subtly or more grossly. We develop "domain adaptation" (DA) mechanisms for adapting the learned (class mixture) reference distribution, used by our anomaly detection system, from one domain, where it was initially learned using supervised training data, to a second (target) domain, where labeled class data is either rare (semisupervised DA) or nonexistent (unsupervised DA).

DETAILED DESCRIPTION OF THE INVENTION

Inspired by greedy feature selection techniques commonly used in supervised learning, this invention improves upon and extends common detection strategies. For supervised classification, it is well-known e.g. [1] that even if all features have some discrimination power, use of all features may in fact grossly degrade classification accuracy unless there is a "sufficient" amount of training data, i.e. that required to learn model parameters accurately enough to exploit this discrimination power. The fact that training data may be limited relative to N motivates feature selection and also e.g. decision trees, which may base decisions on only a small complement of the full set of measured features. Also, for unsupervised clustering in high dimensions, feature selection, embedded within the clustering process, has been demonstrated to be crucial for reliable clustering and for accurate estimation of the number of clusters [2]. Conceptually allied to these approaches, but uncommon in an anomaly detection setting, we propose novel procedures for sequential anomaly detection in a batch that are spartan in their use of features/tests (with growing number of tests). Specifically, new tests are (greedily) included only when they are needed, i.e. when their use (on the remaining undetected sample batch) will yield more statistically significant detections than those obtainable using the existing set of tests. In the next section, we "translate" this principle into a mathematical objective and then propose several sequential detection algorithms for (approximately) optimizing this objective.

The prior work in the statistics literature on optimizing the order of testing when evaluating multiple hypotheses, e.g., [7], does not address anomaly detection in a batch and does not grow the number of tests. There is also work on designing classifiers to maximize the area under the ROC curve, rather than to minimize the classifier's error rate [8]; however, that work addresses a supervised learning scenario, with all classes known a priori and with labeled exemplars provided for each class. By contrast, we will optimize an estimated ROC curve associated with the anomaly detection problem, for which there are no labeled (anomalous) exemplars.

The anomaly detection and domain-adapted classification systems under consideration in the following, which are the subjects of the invention as described in the following preferred embodiments, will operate on hardware (general purpose computers or special purpose network intrusion-detection devices) operating in a communication network that will, e.g., form part of the Internet. Operationally, these systems will automatically consider enormous quantities of packet-data in real-time (over very short time-scales) for classification purposes. The data on which anomaly detection and domain adaptation will be applied is expected to be very complicated as well, e.g. consider a large feature domain of Internet packet-flows.

The various methods of the invention are also readily applied to other types of data to adaptively classify observed activity and/or adaptively detect anomalies, for example, activity logs of individual applications executing in end-hosts/system computers (features may include access to certain regions of memory, CPU usage, related input/output activity), email (spam could be the anomalous activity as may be indicated by the presence and frequency of certain words), unusual event detection (for example, vehicle tracking in video, with the aim to identify unusual vehicle/entity behaviors, as could be indicated by unusual speed or heading, conditioned on the road being traveled), detection of equipment or complex system failures, as well as of anomalous measurements in scientific experiments, which could be indicative either of equipment glitches or of unexpected physical phenomena that may be the basis for scientific discovery.

Sequential Anomaly Detection in a Batch with Growing Number of Tests

Consider a sequential detection process applied to the batch of samples X and suppose that k detections have already been made, with $S^{(k)}$ (or $S\hat{}(k-1)$) subset of $S_T$ the set of tests used in making the first k detections, where $S_T$ (or S_T) is the set of all possible tests that may be used. For now, we will suppose that, before any detections are made, we start with a "default" initial test, i.e. $S^{(0)}=\{s_0\}$ (in the sequel, we will actually specify how the first test used is chosen, for several proposed algorithms). Let $D^{(k)}$ a subset of $T=\{1, 2, \ldots, T\}$ denote the indices of the first k detected samples, with $D^{(0)}$ being the empty set. In making the kth detection, we thus have two choices: 1) make the detection using the existing set of tests $S^{(k-1)}$; 2) make the detection using a new test. Take $v_k$ in $\{0,1\}$, with value 1 signifying that a new test (one not used in the first k−1 detections), denoted $s_k$, is used in making the kth detection, i.e. if $v_k=1$, we will set $S^{(k)}=S^{(k-1)}$ union $s_k$. Now, suppose that $p_1$ is the smallest p-value measured for any of the samples in the set difference $T-D^{(k-1)}$ using the existing tests and let $p_2$ be the smallest p-value measured using a new test. Under choice 1), the probability of observing a p-value more extreme than $p_1$, under the null hypothesis (assuming independent tests) is $$1-(1-p_1)^{|S^{(k-1)}|(T-k+1)}$$

Under choice 2), this probability is $$1-(1-p_2)^{(|S_T-S^{(k-1)}|)(T-k+1)}.$$

To maximize statistical significance of the kth detection, we should make the choice that gives the smaller of the two probabilities. Also, note that this is our estimate of the probability that the kth detection is a false alarm, with one minus this probability our estimate of the probability that this is a true detection. Thus, our choice maximizes the "increment" that the kth detection gives to (effectively, our estimate of) the true detection rate $P_D$ and simultaneously minimizes the increment given to our estimate of the false alarm rate $P_{FA}$. Note that instead of using the precise probability expressions above, one can also potentially use the Bonferroni correction, i.e., where $1-(1-p)^n \approx np$.

More generally, we can write an objective function that measures the aggregate statistical significance of the first L detections. First, we define $$p^*(S,D)=\min\{p(s,n): s \text{ in } S, n \text{ in } D\}$$

where p(s,n) is the p-value for test s on sample n. Then, we have:

$$S_A(L)=\text{sum from } k=1 \text{ to } L: v_k(1-p^*(S_T-S^{(k-1)}, T-D^{(k-1)}))^{|T-S^{(k-1)}|(T-k+1)}+(1-v_k)(1-(1-p^* (S^{(k-1)}, T-D^{(k-1)}))^{|S^{(k-1)}|(T-k+1)}.$$

Note that, based on our above discussion, $S_A(L)$ can also be interpreted as an (aggregated) estimate of the false alarm rate, associated with the first L detections ($P_{FA}(L)$). Further, again based on the above discussion, in minimizing this quantity, we are also equivalently maximizing an (aggregated) estimate of the true detection rate ($P_D(L)$). In other words, minimizing $S_A(L)$ is consistent with maximizing "front-loaded" partial area (for first L detections) under an (estimated) ROC curve (AUC). We aim to maximize the partial AUC associated with the first L detections (as opposed to the total AUC) because a human operator (or some automated response system) may only be able to "handle" (corroborate and act on) L detections in the time it takes to collect a batch of size T, and detections should clearly be prioritized by their significance level. We propose two greedy strategies for maximizing $S_A(L)$. The first simply seeks, at the kth detection step, to maximize significance of this detection without consideration of the effect on significance of future detections. The second (lookahead) strategy is guaranteed to obtain better decision sequences (in the sense of $S_A(L)$) than those found by the first method, albeit while requiring greater computational complexity. An embodiment of the first strategy is Algorithm 1 below.

---
Algorithm 1 - No Lookahead:
---

1) Randomly select the first test to use, $s_1$, from the full set $S_T$. Set $S^{(1)} = \{s_1\}$. Choose, as the first detection, the sample $n_1$ = argmin $\{ p(s_1, n) : n$ in $T\}$. Set $D^{(1)} = \{n_1\}$.
2) For $k = 2, \ldots, L$:
Set $v_k$ to 0.
Reset $v_k$ to 1 if
$1 - (1 - p^*(S_T - S^{(k-1)}, T - D^{(k-1)}))^{|S_T - S^{(k-1)}|(T-k+1)} < 1 - (1 - p^*(S^{(k-1)}, T - D^{(k-1)}))^{|S^{(k-1)}|(T-k+1)}$.
Denote the pair achieving maximum significance by $(s_k, n_k)$.
Set $D^{(k)} = D^{(k-1)}$ union $\{n_k\}$.
If $(v_k = 1)$ then $S^{(k)} = S^{(k-1)}$ union $\{s_k\}$ else $S^{(k)} = S^{(k-1)}$ union $\{n_k\}$.
Endfor
3) Output the detection sets $S^{(L)}$ and $D^{(L)}$.

---

We make the following observations about this embodiment: i) the motivation for random selection of the first test used (rather selecting the test which gives the smallest p-value) is to ensure that, initially, we need only correct for testing all the samples (T), rather than for all (test, sample) pairs (KT)—once new tests are added (first used), they must also be corrected for; ii) note that our procedure has built-in analytical significance assessment for each detection made—thus, one can stop making detections when the assessed significance (at some step) falls below a preset threshold (if the operator's capacity (L) has not yet been reached).

While use of the above exponents performs theoretically-grounded multiple test correction, in another embodiment we also suggest that other exponents may also be considered, in order to best customize the anomaly detection approach for a particular application setting.

Algorithm 2—Lookahead: In the first step, a single test will be used. At step 2, there is the choice of sticking to this test or adding a second test. At step 3, there are 4 possible choices for the sequence of the number of tests in use: $\{(1,1,1), (1,1,2), (1,2,2), (1,2,3)\}$. More generally, for $M < L$ detections, there are $2^M$ such sequences, and we have not even considered the number of possible test configurations that need to be evaluated for each such "number of tests" sequence. Thus, clearly, the solution space grows exponentially in M. Global optimization is apparently infeasible. However, it is possible to improve on Strategy 1 at some computational expense. The key observation is that, whereas one particular test, if chosen at step k, may maximize statistical significance of the kth detection, another test, if instead chosen at step k, may help achieve greater aggregate statistical significance if one looks ahead to additional detection steps k+1, k+2, and so on. In other words, if there is test "clustering", wherein the same test (once added) will be repeatedly used for multiple consecutive (or closely spaced) detections, such a test may be more valuable than a test which, while maximizing statistical significance for the kth detection, will not be used subsequently. For application contexts where multiple anomalies exhibit the same character (and may be detectable using a common test, e.g. if there is a cluster of anomalous samples), such "lookahead" strategies should be valuable, and superior to Strategy 1. One such strategy, guaranteed to improve on Strategy 1 in the aggregate statistical significance objective $S_A(L)$, is as follows.

Consider maximizing the aggregate statistical significance of the first three detections made. As noted above, there are four possible choices for the number of tests sequence. For the first choice, (1,1,1), with a single test used, the best test can be found with complexity $O(|S_T|)$. For the sequences (1,1,2) and (1,2,2), finding the best pair of tests in general requires $O(|S_T|^2)$ complexity (but this is the worst-case complexity—it can be reduced to $O(|S_T|)$ if the two most significant p-values, using different tests, are not for the same samples). Likewise, for the sequence (1,2,3), finding the best test triple will require, worst case, $O(|S_T|^3)$ complexity, but this can be reduced even to $O(|S_T|)$ if the three most significant detections, using different tests, are all for different samples. Having found the best test sequences for each of these four cases, we can select the case (with associated detections and tests) that achieves maximum aggregate statistical significance for the first three detections made. We can then make permanent either just the first detection in the triple, or all three detections in the triple. This procedure can then be repeated. In the former case, this means we next consider detections 2, 3, and 4, while in the latter case we next consider detections 4, 5, and 6. If only the first detection in a triple is made permanent, this procedure "looks ahead" two samples, in making its detection decisions. If all three detections are made permanent, this procedure alternatively makes three detections jointly. Note that we can directly extend this approach to look ahead more than two samples, albeit with increased complexity (based on exponential growth in the number of test sequences and growth in the worst-case complexity of finding the best sequence of tests for a given number of tests sequence).

Determining when to Stop—Significance of Detections

Our Algorithm 1, which does not perform lookahead, naturally yields statistical significance assessments for each detection. For our lookahead procedure, which more directly maximizes aggregate statistical significance, such significance assessments are also automatically provided, although they may not be as accurate as in the non-lookahead case. Accordingly, coupled to Strategy 2, we also alternatively propose to use standard empirical assessment of statistical significance. Specifically, we suppose that, separate from the batch X, there is a fairly large database of examples from the known data class. One can then randomly draw numerous batches (all of size T) from this database. For each such (null) batch, one can apply our sequential detection procedure, which will yield a sequence of significance values, based on $1 - (1-p)^{\#tests}$, associated with the detection sequence. For the kth detection in the actual batch, with significance value d, one can then obtain an empirical significance level, measured as the fraction of kth significance values in the null batches that are smaller than d. Clearly, there is an associated accuracy/computation tradeoff—complexity grows linearly with the number of batches (K) and the smallest significance level attainable for K batches is 1/K. Even without highly accurate significance assessment, via their determination of a detection sequence, our detection approaches give an order of prioritization of samples for consideration (as {anomalous, suspicious, interesting}) by a human operator (or by a higher tier detection system). This may be particularly useful (and perhaps all that is necessary) given that an operator has finite capacity for investigating anomalies and given that the forwarded anomalies may in some way be real-time actionable by the operator.

p-Value for a Mixture of Gaussian Densities

Consider the case where the reference ("normal") densities are modeled by multivariate Gaussian mixtures (GMMs). Let $\{a_k, k=1, \ldots, L\}$, with $a_k$ in interval $[0,1]$ and $1 = $ sum $k=1$ to L of $a_k$, be the masses for an L-component mixture with component densities $f_{\underline{X}|k}(\underline{x}|t_k)$, $k=1, \ldots, L$, where $t_k$ is the parameter set for the kth density. The mixture density is thus $f_{\underline{X}}(\underline{x}) = $ sum $k=1$ to L of $a_k f_{\underline{X}|k}(\underline{x}|t_k)$. We would like to calculate the p-value—the probability that a feature vector will be more extreme than the given observed vector x. For a single multivariate Gaussian density $N(\underline{m},C)$, the corresponding multivariate integral (over the exterior of the ellipse defined by the squared Mahalanobis distance from $\underline{x}$ to $\underline{m}$) can be exactly calculated by applying a whitening transformation, leading to the result that the p-value is 1 minus the Rayleigh cumulative distribution function (CDF) $F_R(r^2(\underline{x}))$, where $r^2(\underline{x})=(\underline{x}-\underline{m})'C^{-1}(\underline{x}-\underline{m})$. Extending to a GMM, we obtain the result that the p-value for a given observation $\underline{x}$ is the sum from j=1 to L of $a_j \exp(-r_j^2(\underline{x})/2)$.

Experimental Results on Packet Flows

Our approach was shown to yield greater area under the ROC curve than two standard detection strategies for a network intrusion domain, detecting Zeus bot intrusion flows embedded amongst (normal) Web flows [10]. We used features that preserve the bidirectional packet size sequence information. Specifically, we considered a 20-dimensional feature vector consisting of alternating server-to-client (S) and client-to-server (C) packet sizes (for the initial packets in the flow, following the 3-way handshake flow inception)—if 2 consecutive packets are in fact in the same direction, a zero packet size (signifying lack of an intervening packet in the other direction) is inserted between them, in the packet size sequence—the resulting packet sequence alternates C S C S . . . No packet interarrival time sequence information is exploited because the bot flows were captured "in the wild" from a different internetwork domain than the captured Web flows, i.e. no realistic packet timing information (for the network domain on which the Web flows were captured) is available for the Zeus flows. We also do not exploit any packet payload information (it is unavailable to us; moreover, encryption can easily defeat deep packet inspection) or port numbers (Zeus flows also use port 80). We used 1024 Web flows, captured from the same port and time-of-day, obtained from the LBNL repository (http://www.icir.org/enterprise-tracing) and 39 bot flows obtained from http://labs.snort.org/papers/zeus.html, all with at least 10 packets following the 3-way handshake. We applied 10-fold cross validation, with the Web flows split equally into 9 training and one test fold, and with all the Zeus flows always added into the test fold. The training Web flows are fit using GMMs (building both a 20-dimensional GMM and all 20 choose 2 (190) bivariate GMM models), with the Bayesian Info nation Criterion used to select the number of components in any given model.

In summary, the proposed Algorithm 1 method performed better than both i) a method which used all 190 bivarate (pairwise feature) GMM p-value tests; ii) a method which used a single p-value test based on a GMM defined on the full (20-dimensional) feature vector.

On-Line Adaptation to New Data and Other Variations

We have described how to learn the (reference/null) distributions from given training data. In practice, these may change over time. Thus, on-line procedures for estimating these distributions can be applied (i.e., for the models considered here, on-line estimation of mixture models). Some of the data for such adaptation may consist of the samples from the test batch that are not deemed to be anomalous. The sample batch may also change in an on-line fashion, with new samples entering and old samples leaving. In this work, we have not rigorously experimentally evaluated our proposed methods for assessing statistical significance of detections. In particular, our analytical approach (conservatively) assumes that all feature pairs are statistically independent. This is clearly not the case, both because some pairs involve the same features and some features will not be statistically independent in general. Thus, assessing the conservativeness of our approach should be studied. Also, alternative, possibly more accurate significance assessments (that do not assume statistical independence) could be investigated, for use both within our objective function $S_A(L)$ and for assessing significance of made detections. We also have not evaluated family-wise type 1 error. Developing analytical statistical significance assessments for our lookahead detection procedure appears to be a challenging, yet also a good subject for future work. Finally, in some cases one may have several "example" anomalies (or prior knowledge of good features/tests), albeit not a sufficient number to learn density models for anomalous "classes". We envision that such samples (prior knowledge) could help to inform our feature (test) selection, e.g., to reduce the search space and thus the complexity of lookahead search procedures. Such examples may also provide a (semisupervised) potential for improving anomaly detection accuracy if they are truly representative of the actual anomalies present in the data batch.

Our anomaly detection can be used in a closed-loop fashion, in conjunction with an active learning system. Specifically, our anomaly detection method prioritizes sample detections and forwards anomaly detections to an agent or human operator. The operator then determines whether the detected anomalies are genuinely anomalous or not. If a detected sample is deemed "normal", this sample can then be fed back, to be included in the training database of "normal" exemplars. If a detected sample is deemed anomalous, appropriate action will be taken by agent/human operator, including potentially active learning adaptation of a supervised classifier trained to discriminate "normal" from anomalous (or, alternatively, "suspicious anomaly" from "innocuous anomaly" or "interesting anomaly" from "uninteresting anomaly").

The "normal" class may in fact consist of a mixture of multiple subclasses, with labeled training exemplars available for each such subclass. If the training exemplars were obtained from one (source) domain and if the anomaly detection system is in fact to be deployed in a different (target) domain, with the subclass distributions domain-dependent, then there is a need to adapt the source domain subclass probability models to the target domain, if anomaly detection is to be successfully applied (with good ROC performance) on the target domain. This motivates classifier (class probability model) domain adaptation, both semisupervised and unsupervised, as developed in the next section.

Regularized Domain Adaptation for Classifiers

We develop methodology for the adaptation of a generative classifier learned (in a supervised fashion) on the source domain, where the joint distribution of features given each class is modeled using a mixture of parametric distributions (typically Gaussian), and where the maximum a posteriori (MAP) rule on the estimated Bayes class posterior is used to make decisions. This approach, also known as mixture discriminant analysis (MDA), is generally capable of learning complex decision boundaries given sufficient training data. We assume that the target domain has a small set of labeled samples, and a relatively large number of unlabeled samples just as in semisupervised learning, but here we additionally exploit the classifier trained in the source domain and the labeled source domain data. Starting from the source domain classifier parameters, the method maximizes the likelihood of target domain data, while constrained to agree as much as possible with the target domain label information. This is achieved via an expectation maximization (EM) algorithm, where the joint distribution of the latent variables in the E-Step is parametrically constrained, in order to ensure space-partitioning implications are gleaned from the few labeled target domain samples.

Consider a labeled source domain data set $\chi_i^{(s)} = \{(\underline{x}_i^{(s)}, c_i^{(s)}), i=1, \ldots, N_l^{(s)}\}$, where $\underline{x}_i^{(s)} \in R^d$ is the feature vector and $c_i^{(s)} \in C = \{1, \ldots, K\}$ is the class label, belonging to one of K classes. We will assume continuous-valued features, but the method can be extended for mixed continuous and discrete valued features as well. The target domain data consists of a labeled subset $\chi_l^{(t)} \{\underline{x}_i^{(t)}, c_i^{(t)}), i=1, \ldots, N_l^{(t)}\}$, and an unlabeled subset—$\chi_u^{(t)} = \{\underline{x}_i^{(t)}, i=N_l^{(t)}+1, \ldots, N_l^{(t)}+N_u^{(t)}\}$, where $\underline{x}_i^{(t)} \in R^d$. It is useful to define the following: the index set of target domain labeled samples $I_l^{(t)} = \{1, 2, \ldots, N_l^{(t)}\}$, the index set of all target domain samples $I^{(t)} = \{1, 2, \ldots, N_l^{(t)} + N_u^{(t)}\}$, and the set of all feature vectors in the target domain data set $\chi^{(t)} = \{\underline{x}_i^{(t)}, \forall i \in I^{(t)}\}$. It s assumed features in the source and target domain are measured in the same way, and have the same semantic meaning. It is also assumed the same set of classes is present in the two domains, albeit perhaps with very different class prior probabilities on the two domains (a missing class in one domain would correspond to the class's prior probability being zero). The source domain classifier is learned by fitting a mixture of Gaussians to the data from each class, hence modeling the class-conditional density of features given that class. The number of mixture components in each class, the structure of the component covariances (full, diagonal, or spherical), and the use of distinct or shared covariances are all chosen according to the Bayesian information criterion (BIC). Also, the class prior of each class in the source domain $\pi_c^{(s)}$ is estimated as the proportion of labeled source domain samples belonging to that class. The set of source domain classifier parameters is defined as $\Theta^{(s)} = \{\Theta_c^{(s)}, \forall c \in C\}$, where $\Theta_c^{(s)} = \{\pi_c^{(s)}, \{\alpha_{cl}^{(s)}, (\underline{\mu}_{cl}^{(s)}, \Sigma_{cl}^{(s)})\forall l \in M_c\}\}$ is the set of parameters for class c. Here, $M_c$ is the set of components for class c, and $\alpha_{cl}^{(s)}, \underline{\mu}_{cl}^{(s)}, \Sigma_{cl}^{(s)}$ are the prior probability, mean vector, and covariance matrix respectively for component l in class c. The similarly defined set of target domain classifier parameters $\Theta^{(t)} = \{\Theta_c^{(t)}, \forall c \in C\}$ has to be estimated through domain adaptation.

In order to define the objective function for our problem, we define a set of binary, latent random variables $Z = \{Z_{icl} \forall i \in I^{(t)}, \forall c \in C, \forall l \in M_c\}$, where $Z_{icl} = 1$ if sample $\underline{x}_i^{(t)}$ is assigned to class c and its l-th component; else $Z_{icl} = 0$. Also, define $P(c, l | \underline{x}) \equiv P(C = c, M_c = l | \underline{x})$ as the joint probability of class c and mixture component l given feature vector $\underline{x}$, where $M_c$ is the mixture component from class c (different from $M_c$ which is the set of values taken by $M_c$). The expected complete data log-likelihood for the target domain data is given by $$E[L(\chi^{(t)}, Z, \Theta) | \chi^{(t)}] = \sum_{i \in I^{(t)}} \sum_{c \in C} \sum_{l \in M_c} P(c, l | x_i^{(t)}) \log[\pi_c \alpha_{cl} G(x_i^{(t)}; \underline{\mu}_{cl}, \Sigma_{cl})],$$

where $G(\underline{x}; \underline{\mu}, \Sigma)$ is the multivariate Gaussian density and $L(\chi^{(t)}, Z, \Theta)$ is the complete log-likelihood of the target domain data. Assuming the samples are generated independently, the entropy of the posterior distribution of Z given data $\chi^{(t)}$ is given by $$H[P(Z | \chi^{(t)})] = - \sum_{i \in I^{(t)}} \sum_{c \in C} \sum_{l \in M_c} P(c, l | x_i^{(t)}) \log P(c, l | x_i^{(t)}).$$

Following the principles of the EM algorithm, we define the optimization problem as $$\min_{\Theta, \{P(c, l | x_i^{(t)})\}} -E[L(\chi^{(t)}, Z, \Theta) | \chi^{(t)}] - H[P(Z | \chi^{(t)})]$$

$$\text{subject to } \sum_{i \in I_l^{(t)}} \sum_{\substack{c \in C \\ c \neq c_i^{(t)}}} \sum_{l \in M_c} P(c, l | x_i^{(t)}) \leq \rho.$$

Here, the constraint counts up the assignment of labeled target domain samples to components that are affiliated to the "wrong" class, and thus tries to discourage such assignments. The associated Lagrangian, with a positive Lagrange multiplier $\beta$, is given by $$F \equiv -E[L(\chi^{(t)}, Z, \Theta) | \chi^{(t)}] - H[P(Z | \chi^{(t)})] + \beta \sum_{i \in I_l^{(t)}} \sum_{\substack{c \in C \\ c \neq c_i^{(t)}}} \sum_{l \in M_c} P(c, l | x_i^{(t)}).$$

The term multiplying $\beta$ is called the penalty. A standard approach for solving this problem is the EM algorithm, with the expectation or E-step solving $$\min_{\{P(c, l | x_i^{(t)})\}} F$$

and the maximization or M-Step solving $$\min_{\Theta} F,$$

alternately, until a local minimum is reached. We suppose, at least for now, that it is reasonable to initialize the EM algorithm with the learned source domain parameters $\Theta^{(s)}$, preserving the same number of components and the covariance matrix structure for the mixture models in each class. Later, we discuss the need for random initialization of the parameters. We take a non-standard approach to solving the optimization problem in the E-step, which is motivated by the need to have space-partitioning implications gleaned from the labeled sample constraints. For a detailed discussion and illustration of this, please refer to the original paper [1].

Parametric E-Step

We constrain the posterior probabilities of the latent variables to follow a parametric form consistent with (i.e., with the same descriptive power as) the type of distribution used in the mixture model for each class (in this case multivariate Gaussian):

$$\hat{P}(c, l | \underline{x}) = \frac{\exp[\underline{x}^T W_{cl} \underline{x} + \underline{x}^T \underline{w}_{cl} + b_{cl}]}{\sum_{k \in C} \sum_{m \in M_c} \exp[\underline{x}^T W_{km} \underline{x} + \underline{x}^T \underline{w}_{km} + b_{km}]} \forall c \in C,$$

$$\forall l \in M_c, \forall \underline{x} \in R^d,$$

where $W_{cl} \in R^{d \times d}$ and symmetric, $\underline{w}_{cl} \in R^d$, and $b_{cl} \in R$. The E-Step now involves optimization with respect to the parameter set $\{(W_{cl}, \underline{w}_{cl}, b_{cl}) \forall c \in C, \forall l \in M_c\}$, which we call the weight parameters to distinguish them from the mixture model parameters. Since this optimization does not have a closed form solution, we use a gradient descent method on all the weight parameters until convergence is achieved. The weight parameters are initialized for the EM algorithm by equating terms in the exponent of $\hat{P}(c,l|\underline{x})$ with corresponding terms in a standard Gaussian mixture posterior, evaluated at the initial source domain parameter values (denoted with a superscript (0)), which gives $$W_{cl}^{(0)} = -\frac{1}{2}(\Sigma_{cl}^{(0)})^{-1}, \underline{w}_{cl}^{(0)} = (\Sigma_{cl}^{(0)})^{-1}\underline{\mu}_{cl}^{(0)},$$

$$b_{cl}^{(0)} = \ln(\pi_c^{(0)}\alpha_{cl}^{(0)}) - \frac{1}{2}\log[(2\pi)^d|\Sigma_{cl}^{(0)}|] - \frac{1}{2}(\underline{\mu}_{cl}^{(0)})^T(\Sigma_{cl}^{(0)})^{-1}(\underline{\mu}_{cl}^{(0)}).$$

M-Step Updates

The M-step update equations for all parameters at iteration 'n' of the algorithm are given below. The superscript on all quantities is used to indicate the EM iteration at which their value is calculated.

$$\pi_c^{(n+1)} = \frac{\sum_{\underline{x}\in\chi^{(t)}}\sum_{l\in M_c}\hat{P}^{(n)}(c,l|\underline{x})}{N_u + N_l} \; \forall \, c \in C,$$

$$\alpha_{cl}^{(n+1)} = \frac{\sum_{\underline{x}\in\chi^{(t)}}\hat{P}^{(n)}(c,l|\underline{x})}{\sum_{\underline{x}\in\chi^{(t)}}\sum_{l\in M_c}\hat{P}^{(n)}(c,l|\underline{x})} \; \forall \, c \in C, \forall \, l \in M_c,$$

$$\underline{\mu}_{cl}^{(n+1)} = \frac{\sum_{\underline{x}\in\chi^{(t)}}\hat{P}^{(n)}(c,l|\underline{x})\underline{x}}{\sum_{\underline{x}\in\chi^{(t)}}\hat{P}^{(n)}(c,l|\underline{x})} \; \forall \, c \in C, \forall \, l \in M_c,$$

$$\Sigma_{cl}^{(n+1)} = \frac{\sum_{\underline{x}\in\chi^{(t)}}\hat{P}^{(n)}(c,l|\underline{x})(\underline{x}-\underline{\mu}_{cl}^{(n+1)})(\underline{x}-\underline{\mu}_{cl}^{(n+1)})^T}{\sum_{\underline{x}\in\chi^{(t)}}\hat{P}^{(n)}(c,l|\underline{x})} \; \forall \, c \in C,$$

$\forall \, l \in M_c.$

Overall Learning Strategy

For a fixed value of $\beta \geq 0$, the Lagrangian $F(\beta)$ is minimized by alternating the E and M steps to convergence. The penalty coefficient $\beta$ is increased in steps, starting from a small value, and at each step $F(\beta)$ is minimized using the EM algorithm, initialized with the same set of parameters. This optimization for successive $\beta$ values is performed until the difference between the penalty (at convergence) at successive values of $\beta$ falls below a threshold (e.g. we used a value of 0.001 in experiments). From experiments, we have observed that, initializing with the source domain parameters, in some situations the penalty at convergence may not be sufficiently small even when $\beta$ is made large (This may be due to local minima and/or to significant changes in distribution between the two domains). To remedy the local minimum problem, we apply random restarts, repeating the aforementioned procedure from different random initializations, created by perturbing the component means of the source domain mixture models. Specifically, supposing the mean and variance of a particular source domain component along a particular dimension are $\mu_s$ and $\sigma_s^2$ respectively, then the corresponding initial target domain component mean is generated uniformly on the interval $(\mu_s - 2\sigma_s, \mu_s + 2\sigma_s)$. This is done along all dimensions, and for all the mixture components (i.e. $\forall l \in M_c, \forall c \in C$). All the other initial parameters are set equal to the corresponding source domain parameters.

Choosing a Unique Solution Using a Validation Criterion

To select between the different solutions (from random restarts, and obtained at different $\beta$ values), we define a validation criterion called transformed source domain accuracy. For this (validation) purpose, suppose that we learn a Gaussian mixture model (GMM) separately on the source and target domains, in an unsupervised fashion (i.e. ignoring the available class labels), with BIC used to choose the number of components. Each source domain component is then mapped to a particular target domain component, such that the overall cost of mapping $$\sum_{i\in M^{(s)}}\sum_{j\in M^{(t)}} v_{ij}c_{ij}$$

is minimized, where $M^{(s)}$ and $M^{(t)}$ are the index sets of the source and target domain components, $v_{ij}$ is a binary variable which takes a value 1 if component i is mapped to component j, and $c_{ij}$ is the cost of mapping component i to component j. We choose $c_{ij}$ as the Euclidean distance between the mean of source component i and the mean of target component j. The objective function here is that of the well-known linear assignment problem, which can be solved using the well-known Hungarian algorithm. Since the component densities are multivariate Gaussian, there exists a unique affine transformation $T_{ij}(\underline{x})$ that takes a feature vector $\underline{x}$ belonging to source component i to target component j. The transformed source domain accuracy is then defined as $$\sum_{(\underline{x},c)\in\chi_l^{(s)}} \frac{\pi_c^{(t)}}{\pi_c^{(s)}} \frac{1}{N_l^{(s)}} \sum_{l\in M^{(s)}} P_s(l|\underline{x})\delta[\hat{C}_t(T_l(\underline{x})) = c],$$

where $P_s(l|\underline{x})$ is the mixture component posterior of the source domain unsupervised mixture model, $$T_l(\underline{x}) = \sum_{j\in M^{(t)}} v_{ij}T_{ij}(\underline{x}),$$

$\delta[.]$ is a binary indicator, which takes a value 1 if the condition in its argument is satisfied, and $$\hat{C}_t(\underline{x}) = \underset{c\in C}{\operatorname{argmax}} \sum_{l\in M_c} \hat{P}(c,l|\underline{x})$$

is the predicted class obtained by applying the MAP rule to the target domain parameterized class posterior. The ratio $$\frac{\pi_c^{(t)}}{\pi_c^{(s)}}$$

is an importance sampling factor to account for the difference in class priors between the source and target domains. Also, $\pi_c^{(t)}$ is obtained from the M-step update equation for the class prior, upon convergence of the EM algorithm.

The method to select a unique solution using the transformed source domain accuracy is as follows. We have a set of candidate solutions obtained from the random restarts, and from the variation of β for each restart. The subset of these solutions which have transformed source domain accuracy less than η, and a penalty which is greater than ε, are eliminated to avoid solutions which potentially have poor generalization on the target domain. From the remaining solutions, we choose the one with the smallest value of the objective function F as the final solution for making predictions on the target domain. In order to choose η, we look at the histogram of the transformed source domain accuracy, and choose a value near the maximum where the density of solutions is relatively high. Similarly, ε is chosen near the minimum of the histogram of penalty values.

An Alternate Semi-Supervised Maximum Likelihood Approach

We compared our method with two baselines, one being a direct porting of the source domain classifier, and the other a pure semisupervised learning method on the target domain (the Mixture of Experts (MOE) classifier). We also compared with the following extension of the unsupervised maximum likelihood domain adaptation method. The objective function of that method is slightly modified to condition on available target domain class label information as follows:

$$L(\chi_u^{(t)}, \chi_l^{(t)}, \Theta) = \sum_{(x,c) \in \chi_l^{(t)}} \log\left[\sum_{l \in M_c} \pi_c \alpha_{cl} G(x; \mu_{cl}, \Sigma_{cl})\right] +$$

$$\sum_{x \in \chi_u^{(t)}} \log\left[\sum_{c \in C} \sum_{l \in M_c} \pi_c \alpha_{cl} G(x; \mu_{cl}, \Sigma_{cl})\right].$$

There is a closed form EM algorithm for maximizing this objective, and the algorithm is repeated from different random initializations of the parameters in the same way as done in our method. Also, as described earlier, the transformed source domain accuracy, and the error rate on the labeled target domain samples (akin to the penalty) are used to form a reduced set of candidate solutions. Among these candidate solutions, the one with largest log-likelihood is selected.

Unsupervised Domain Adaptation

In situations where there are no labeled samples in the target domain, one may find that domain adaptation methods may not be very beneficial or may even be detrimental, unless the class-conditional feature distributions in the source and target domains are relatively close to each other. To address such cases, we formulate a customized objective function for unsupervised adaptation of a generative classifier model learned on the source domain. In particular, suppose we model the class conditional distributions of features in the source domain using a mixture of Gaussians; then there is an underlying affine transformation (matrix) mapping the source features to target features (and vice-versa) for each class. We can optimize these affine transformations in order to minimize a regularized sum of squared deviations between the means and correlations of the source and affine transformed target domain features. The regularization is used to ensure that the affine transformations are not "very different" for the unity transformation (i.e. no transformation), consistent with the assumption stated at the beginning. Note that this "unsupervised" embodiment (compared to the "semisupervised" embodiment disclosed above exploiting some labeled samples in the target domain) was the subject of U.S. Provisional Patent Application Ser. No. 61/483,408, filed in May, 2011, the entire content of which is incorporated herein by reference.

Alternative Cluster Metrics

In the semisupervised domain adaptation method, transformed source domain accuracy was used as a criterion for rejecting potentially "poor" solutions obtained from the different random initializations and for different β values. Firstly, we can consider variations of the cost $c_{ij}$ between source and target domain component pairs. Instead of the Euclidean distance between the means, one can use a divergence measure between probability distributions such as the Kullback-Leibler, Hellinger, Bhattacharya, or the Earth-mover's distance. In particular, when the number of mixture components in the source and target domains are very different, we would like to allow a probabilistic mapping between them (instead of a hard assignment obtained using the Hungarian algorithm). Also, we would like to take into account the class proportions within a component in the process of finding a mapping between the source and target domain components. That is, we would prefer not to link source and target domain components which have very different class proportions. The Earth mover's distance formulation using the Transportation problem allows a way of taking into consideration these factors, while determining the source to target mapping.

Interoperation with Other Classifiers (Decision Trees)

Decision trees are known to achieve high classification accuracies in many real world problems, and it is useful to consider the adaptation of these classifiers. These classifiers can accommodate categorical features as well. Based on the solution obtained from a semisupervised mixture-model based domain adaptation (working on quantitative/numerical features), there is a unique inverse affine transformation mapping of quantitative feature vectors in the target domain back to the source domain. Hence, we can combine the labeled data from the target domain after applying the inverse transformation on their quantitative feature components, with the labeled data in the source domain to retrain a "source-domain" decision tree classifier. Another factor that we have not considered so far is the potential mismatch between the class priors in the two domains, which is not compensated for by the affine transformation mapping. We can use an importance sampling factor on the labeled source domain samples to compensate for this class prior mismatch while re-training the decision tree classifier using weighted data samples. This approach can also be used to domain adapt other discriminative classifiers.

Mismatch in the Number of Components Between the Source and Target Domains

In situations where there are fewer components in the target domain than in the source domain, the classifier domain adaptation may effectively reduce the number of adapted source-domain components via a competitive component "attrition" process, i.e. some adapted source domain components may acquire very little (or even zero) target domain probability mass. Such components can in fact be eliminated. Again, the number of components in the target domain can be assessed in an unsupervised fashion, e.g., by unsupervised mixture modeling, with model order chosen using criteria such as the Bayesian Information Criterion (BIC) or minimum description length (MDL).

In situations where the number of components in the target domain is greater than that in the source domain, we can create extra (initially duplicate) source domain components where they are estimated to be needed (based on where the extra target domain components reside), and then slightly perturb these duplicate components. Subsequent semisupervised domain adaptation will allow these extra source domain components to be effectively used to well-fit the target domain data batch.

Active Learning

In situations where there is a mechanism (either human operator-based or automated) for labeling additional target domain examples in real-time, we can apply an "active learning" wrapper, to judiciously select target domain samples for labeling, around the (now continually running) domain adaptation process.

Discrepancies in the Number of Classes Between the Source and Target Domains

In addition to discrepancies between the number of components present in the source and target domains, there also may be discrepancies in the number of application classes present in the source and target domains. The situation where there are source-domain classes that are not present in the target domain (albeit with this fact unknown) is just an extreme example of the above scenario where the number of source domain components is larger than the number of target domain components—in this case, all source domain components from a class missing in the target domain are "extraneous". In practice, many of these extra components will be "attrited" through the semisupervised domain adaptation process.

Instead of missing classes in the target domain, it is also possible that there may be missing classes in the source domain, i.e. there may be novel classes (relative to those in the source domain) that are in fact "latently" present in the target domain, in the sense that there are no labeled examples of these classes. In such a case, it is in fact likely unknown that these classes are actually present in the target domain. This scenario can be handled effectively by adapting the methodology in [16]. Specifically, domain-adapted components which do not own any labeled samples can be highlighted as "suspicious" or as putative novel classes and directed to a human operator. Moreover, hypothesis testing can be applied to assess the likelihood that by-chance a component owns no labeled samples, given the batch size and the fraction of labeled target domain samples. These components could correspond to particular types of malicious activity (not present in the source domain training data) or simply to unexpected application types (e.g., on-line gaming on a private enterprise (work-place) network). It will be apparent to those of skill in the art that the situation of unknown classes in the source domain is clearly the same situation as the problem of anomaly detection described above.

REFERENCES

[1] G. Trunk (1979) A problem of dimensionality: a simple example. IEEE Transactions on Pattern Analysis and Machine Intelligence (PAMI) 1: 306-307.
[2] M. Graham, D. J. Miller (2006) Unsupervised learning of parsimonious mixtures on large spaces with integrated feature and component selection. IEEE Transactions on Signal Processing 54: 1289-1303.
[3] G. Schwarz (1978) Estimating the dimension of a model. Annals of Statistics 6:461-464.
[4] Z. B. Celik, J. Raghuram, G. Kesidis, and D. J. Miller (2011) Salting public traces with attack traffic to test flow classifiers. Proc. USENIX Cyber Security Experimentation and Test (CSET) Workshop, San Francisco.
[5] W. Li and A. W. Moore (2007) A machine learning approach for efficient traffic classification. In Proc. of IEEE MASCOTS.
[6] F. Bretz, T. Hothorn, F. Westfall (2011) Multiple comparisons using R. CRC Press.
[7] S. Holm (1979) A simple sequentially rejective multiple testing procedure. Scandinavian Journal of Statistics. 6:65-70.
[8] L. Yan, R. Dodier, M. C. Mozer, R. Wolniewicz (2003) Optimizing classifier performance via the Wilcoxon-Mann-Whitney statistics. Proc. of Int'l Conf. on Machine Learning.
[9] N. Duffield, P. Haffner, B. Krishnamurthy, and H. Ringberg (2009) Rule-Based Anomaly Detection on IP Flows. Proc. IEEE INFOCOM.
[10] D. J. Miller, F. Kocak, and G. Kesidis (2012) Sequential anomaly detection in a batch with growing number of tests: Application to network intrusion detection. Paper under review for publication.
[11] J. Raghuram, G. Kesidis, D. J. Miller (2012) Semisupervised Domain Adaptation for Mixture Model Based Classifiers. In Proc. Conference on Information Science and Systems (CISS), Princeton, March.
[12] G. Zou, G. Kesidis, and D. Miller (2010) A flow classifier with tamper-resistant features and an evaluation of its portability to new domains. IEEE Journal on Selected Areas of Communication (JSAC), August
[13] S. Ben-David, J. Blitzer, K. Crammer, and F. Pereira (2007) Analysis of representations for domain adaptation. In Proc. Advances in Neural Information Processing Systems (NIPS), Cambridge, Mass.
[14] J. Blitzer, R. McDonald, and F. Pereira (2006) Domain adaptation with structural correspondence learning. In Proc. Conference on Empirical Methods in Natural Language Processing (EMNLP), Stroudsburg, Pa., pp. 120-128.
[15] L. Bruzzone and M. Marconcini (2010) Domain adaptation problems: A DASVM classification technique and a circular validation strategy. IEEE Trans. Pattern Analysis and Machine Intelligence (PAMI) 32(5):770-787.
[16] L. Bruzzone and D. Prieto (2001) Unsupervised retraining of a maximum likelihood classifier for the analysis of multitemporal remote sensing images. IEEE Trans. Geoscience and Remote Sensing 39(2):456-460, February
[17] H. Daume III and D. Marcu (2006) Domain adaptation for statistical classifiers. J. Artif. Int. Res. 26:101-126.
[18] A. W. Moore and D. Zuev (2005) Internet traffic classification using Bayesian analysis techniques. In Proc. ACM SIGMETRICS International Conference on Measurement and Modeling of Computer Systems.
[19] T. Nguyen and G. Armitage (2008) A survey of techniques for Internet traffic classification using machine learning. IEEE Communications Surveys Tutorials (COMST) 10(4):56-76.
[20] S. Satpal and S. Sarawagi (2007) Domain adaptation of conditional probability models via feature subsetting. In Proc. 11th European conference on Principles and Practice of Knowledge Discovery in Databases (PKDD).
[21] Q. Zhao and D. Miller (2005) Mixture modeling with pairwise, instance-level class constraints," Neural computation 17(11): 2482-2507.
[22] D. Klein, S. Kamvar, and C. Manning (2002) From instance-level constraints to space-level constraints: Making the most of prior knowledge in data clustering. In Proc. International. Conference on Machine Learning (ICML), July.

[23] T. Hastie and R. Tibshirani (1996) Discriminant analysis by Gaussian mixtures. Journal of the Royal Statistical Society Series B (Methodological), pp. 155-176.

[24] D. Miller and J. Browning (2003) A mixture model and EM-based algorithm for class discovery, robust classification, and outlier rejection in mixed labeled/unlabeled data sets. IEEE Trans. on Pattern Analysis and Machine Intelligence (PAMI).

[25] V. Chandola, A. Banerjee, V. Kumar (2009) Anomaly detection: A survey. ACM Computing Surveys 41(15)

The invention claimed is:

1. A method of adapting a mixture-model-based classifier capable of partitioning a feature space, from a source domain with labeled data samples (measured on that feature space) on which the classifier was trained, to a target domain having unlabeled data and a limited set of labeled data, the method, executed on a computer processor operating on certain common data-sample features, comprising the steps of:
providing a set of source domain classifier parameters;
expressing the adaptation of the source domain classifier parameters to the target domain data in terms of a constrained optimization of an objective function that considers both a mixture model fitting of its component (latent) variables to the unlabeled data from the target domain and a measure of classifier accuracy on the labeled data from the target domain;
providing an algorithm for execution on the computer to automatically optimize the objective function for successive constraint values on the classifier's accuracy on the labeled target domain data; and
wherein the distribution of the latent variables is parametrically constrained so that feature-space partitioning implications are imposed by the limited set of labeled target domain data.

2. The method of claim 1, wherein the objective function is a Lagrangian, comprising a likelihood function plus a classifier error rate measure times a Lagrange multiplier.

3. The method of claim 2, wherein the optimization algorithm is Expectation-Maximization (EM).

4. The method of claim 1, wherein the classifier is based on a Gaussian mixture model.

5. The method of claim 1, wherein the target domain data and the source domain classifier change temporally.

6. The method of claim 1 wherein the target domain data are temporally updated using a sliding time-window of data.

7. The method of claim 1 wherein the source domain mixture model classifier is temporally adapted using an on-line Expectation-Maximization algorithm.

8. The method of claim 1, wherein the source domain mixture components are assigned to target domain mixture components using the Hungarian assignment algorithm to minimize a Euclidean distance metric between the source and target domain mixture components.

9. The method of claim 1, wherein additional labeled target-domain samples are made available and accounted for by active learning.

10. The method of claim 1, wherein there are fewer components in the target domain than in the source domain, the method comprising the steps of:
assessing the number of components in the target domain; and
reducing the number of source domain components to match the target domain by competitive attrition.

11. The method of claim 1, wherein there are more components in the target domain than in the source domain, the method comprising the steps of:
assessing the number of components in the target domain; and
adding initially duplicate source domain components, where they are estimated to be needed, prior to source-to-target domain adaptation.

12. The method of claim 1, wherein there are fewer classes in the target domain than in the source domain by eliminating the components of the classes not present in the target domain by component attrition.

13. The method of claim 1, wherein the target domain components that do not own any labeled samples are identified as putative novel or unanticipated classes.

14. A method of adapting a mixture-model-based classifier capable of partitioning a feature space, from a source domain with labeled data samples (measured on that feature space) on which the classifier was trained, to a target domain having no labeled data samples, the method comprising the steps of:
providing a set of source domain classifier parameters to a computer processor; and
executing, on the computer processor, a mixture-model-fitting optimization algorithm over the parameters on a function of both these parameters and of the unlabeled data from the target domain.

15. The method of claim 14, wherein the optimization algorithm is Expectation-Maximization (EM).

16. The method of claim 14, wherein the objective function is a Lagrangian, consisting of a likelihood function plus a classifier error rate measure times a Lagrange multiplier.

17. The method of claim 14, wherein the classifier is based on a Gaussian mixture model.

18. The method of claim 14, wherein the target domain data and the source domain classifier change temporally.

19. The method of claim 14, wherein the target domain data are temporally updated using a sliding time-window of data.

20. The method of claim 14, wherein the source domain mixture model classifier is temporally adapted using an on-line Expectation-Maximization algorithm.

21. The method of claim 14, including the step of assigning the source domain mixture components to target domain mixture components using the Hungarian algorithm to minimize a Euclidean distance metric between the matched source and target domain components.

22. The method of claim 14, wherein labeled target-domain samples are made available and accounted for by active learning.

23. The method of claim 14, wherein there are fewer components in the target domain than in the source domain, the method comprising the steps of:
assessing the number of components in the target domain; and
reducing the number of source domain components to match the target domain by competitive attrition.

24. The method of claim 14, wherein there are more components in the target domain than in the source domain, the method comprising the steps of:
assessing the number of components in the target domain; and
adding initially duplicate source domain components where they are estimated to be needed.

* * * * *